(12) United States Patent
Hughett et al.

(10) Patent No.: US 8,870,095 B2
(45) Date of Patent: Oct. 28, 2014

(54) LOCKING PRESSURIZED FLUID CONNECTION

(75) Inventors: Michael S. Hughett, Monrovia, IN (US); Kurt J. Thomas, Indianapolis, IN (US)

(73) Assignees: Masco Corporation of Indiana, Indianapolis, IN (US); Mercury Plastics, Inc., Middlefield, OH (US)

( * ) Notice: Subject to any disclaimer, the term of this patent is extended or adjusted under 35 U.S.C. 154(b) by 544 days.

(21) Appl. No.: 12/993,722

(22) PCT Filed: May 29, 2009

(86) PCT No.: PCT/US2009/045613
§ 371 (c)(1),
(2), (4) Date: Nov. 19, 2010

(87) PCT Pub. No.: WO2009/146410
PCT Pub. Date: Dec. 3, 2009

(65) Prior Publication Data
US 2011/0089263 A1    Apr. 21, 2011

Related U.S. Application Data

(60) Provisional application No. 61/130,472, filed on May 30, 2008.

(51) Int. Cl.
| | | |
|---|---|---|
| *E03C 1/08* | (2006.01) | |
| *A62C 31/00* | (2006.01) | |
| *F16L 37/00* | (2006.01) | |
| *F16L 25/00* | (2006.01) | |
| *F16L 21/00* | (2006.01) | |
| *E03C 1/04* | (2006.01) | |
| *E03C 1/084* | (2006.01) | |
| *F16L 37/252* | (2006.01) | |
| *F16L 37/248* | (2006.01) | |
| *B05B 7/04* | (2006.01) | |
| *B05B 1/18* | (2006.01) | |

(52) U.S. Cl.
CPC .............. *E03C 1/0404* (2013.01); *B05B 7/0425* (2013.01); *E03C 1/08* (2013.01); *E03C 1/084* (2013.01); *B05B 1/18* (2013.01); *F16L 37/252* (2013.01); *F16L 37/248* (2013.01); *E03C 2001/082* (2013.01)
USPC ........ 239/428.5; 239/442; 285/396; 285/402; 285/313

(58) Field of Classification Search
CPC ..... E03C 1/084; E03C 1/08; E03C 2001/082; E03C 1/0404; E03C 1/04; B05B 7/0425; B05B 1/18; F16L 37/248; F16L 37/252; F16L 37/113; F16L 37/107
USPC ......... 239/428.5; 4/675, 678; 285/313, 292.1, 285/396, 402; 137/801
See application file for complete search history.

(56) References Cited

U.S. PATENT DOCUMENTS 2,449,920 A * 9/1948 Williams ...................... 285/314
2,816,746 A * 12/1957 Botnick ...................... 261/64.1

(Continued)

OTHER PUBLICATIONS

International Search Report and Written Opinion for PCT Application No. PCT/US2009/045613, issued Jul. 16, 2009, 9 pgs.

*Primary Examiner* — Len Tran
*Assistant Examiner* — Alexander M Valvis
(74) *Attorney, Agent, or Firm* — Faegre Baker Daniels LLP (57) ABSTRACT

A water delivery system (10) includes a first component (52) coupled to a fluid transport member (20) and a second component (66) coupled to an aerator (34) for positioning within a faucet spout (26).

15 Claims, 10 Drawing Sheets

(56) References Cited

U.S. PATENT DOCUMENTS

| | | | | |
|---|---|---|---|---|
| 3,110,445 A | * | 11/1963 | Benjamin et al. | 239/428.5 |
| 3,596,936 A | * | 8/1971 | Dieckmann et al. | 285/222.1 |
| 3,760,951 A | * | 9/1973 | Mansfield | 210/449 |
| 4,133,347 A | * | 1/1979 | Mercer | 137/240 |
| 4,649,958 A | * | 3/1987 | Purcell | 137/801 |
| 5,459,901 A | | 10/1995 | Blase et al. | |
| 5,560,548 A | * | 10/1996 | Mueller et al. | 239/442 |
| 5,613,638 A | * | 3/1997 | Blessing | 239/396 |
| 5,624,073 A | * | 4/1997 | Mueller et al. | 239/442 |
| 5,669,417 A | | 9/1997 | Lian-Jie | |
| 5,781,942 A | | 7/1998 | Allen et al. | |
| 6,270,022 B1 | * | 8/2001 | Knapp | 239/428.5 |
| 6,732,956 B1 | | 5/2004 | Chetrit et al. | |
| 7,017,600 B2 | | 3/2006 | Klein | |
| 7,147,773 B2 | | 12/2006 | Mitchell et al. | |
| 7,252,248 B2 | * | 8/2007 | Cutler | 239/428.5 |
| 7,264,180 B2 | * | 9/2007 | Mueller | 239/428.5 |
| 7,281,391 B2 | | 10/2007 | Marrett et al. | |
| 7,490,372 B2 | * | 2/2009 | Huang | 4/615 |
| 7,494,074 B2 | * | 2/2009 | Benstead | 239/449 |
| 7,600,515 B2 | * | 10/2009 | Matlock | 128/207.14 |
| 7,753,074 B2 | | 7/2010 | Rosko et al. | |
| 7,766,043 B2 | * | 8/2010 | Thomas et al. | 137/801 |
| 7,832,775 B2 | * | 11/2010 | Regener et al. | 285/377 |
| 8,302,620 B2 | * | 11/2012 | Lin | 137/315.12 |
| 2003/0102037 A1 | | 6/2003 | Parsons | |
| 2004/0154673 A1 | * | 8/2004 | Mascari et al. | 137/801 |
| 2005/0125893 A1 | | 6/2005 | Zhadanov et al. | 4/675 |
| 2006/0130907 A1 | * | 6/2006 | Marty et al. | 137/613 |
| 2006/0151034 A1 | | 7/2006 | Klein | |
| 2006/0151635 A1 | * | 7/2006 | Laker | 239/533.1 |
| 2006/0174955 A1 | * | 8/2006 | Huang | 137/625.17 |
| 2006/0186030 A1 | * | 8/2006 | Sohn et al. | 210/232 |
| 2007/0271695 A1 | | 11/2007 | Thomas et al. | |
| 2008/0023085 A1 | | 1/2008 | Rosko et al. | |

* cited by examiner

LOCKING PRESSURIZED FLUID CONNECTION

CROSS-REFERENCE TO RELATED APPLICATION

This application is a national phase filing of PCT International Application Serial No. PCT/US2009/045613, filed May 29, 2009, which claims the benefit of U.S. Provisional Patent Application Ser. No. 61/130,472, filed May 30, 2008, the disclosures of which are expressly incorporated herein by reference.

BACKGROUND AND SUMMARY OF THE INVENTION

The present invention relates to fluid connections and, in particular, to locking pressurized fluid connections configured for use with an aerator disposed at the outlet end of a faucet delivery spout.

Water delivery devices, such as faucets, are known to include a valve which may be controlled to regulate the flow of water delivered to the outlet end of a delivery spout.

In an illustrative embodiment of the present disclosure, a locking pressurized fluid connection includes a first component, a second component, and a seal intermediate the components. The first component is illustratively a male adapter having a pair of elongated pins and a pair of locking tabs. The elongated pins are configured to facilitate surface contact between the first and second components. The second component is illustratively a female adapter having a pair of channels to allow the elongated pins to slide into and through a slot and permitting rotation of the first component relative to the second component. A pair of ramps allow the locking tabs on the first component to flex over and lock behind when a full quarter turn between the first and second components has been achieved.

According to an illustrative embodiment of the present disclosure, a water delivery system is provided in fluid communication with at least one valve. The water delivery system includes a spout having a discharge end, and an aerator for positioning adjacent the discharge end of the spout. A fluid transport member includes a fluid conduit with a first end in fluid communication with the at least one valve and a second end positioned proximate the discharge end of the spout. A first component is coupled to the fluid transport member and includes a side wall defining a fluid conduit extending along a longitudinal axis and in fluid communication with the fluid conduit of the fluid transport member. The first component further includes at least one guide pin extending radially outwardly from the side wall. A second component is coupled to the aerator and includes a side wall defining a bore sealingly receiving the first component and having a channel to receive the at least one guide pin. The second component is rotatable relative to the first component between an unlocked position and a locked position. The at least one guide pin is free to move axially within the channel when in the unlocked position and is restrained from axial movement within the channel when in the locked position.

According to a further illustrative embodiment of the present disclosure, a water delivery system is provided in fluid communication with at least one valve. The water delivery system includes a body defining a longitudinal axis, and a fluid transport member having an end positioned within the body and adapted to be in fluid communication with the at least one valve. A holder is supported by the body and includes a fluid conduit having a first end and a second end. The end of the fluid transport member is received in the first end of the holder. An aerator is coupled to the second end of the holder. The end of the fluid transport member is held within the fluid conduit of the holder by translating the holder along the longitudinal axis of the body in a first direction and then rotating the holder about the longitudinal axis in a second direction to a locked position. The end of the fluid transport member is removable from within the fluid conduit of the holder by rotating the holder about the longitudinal axis in a third direction opposite the second direction and translating the holder along the longitudinal axis of the body in a fourth direction opposite the first direction to an unlocked position.

According to another illustrative embodiment of the present disclosure, a fluid coupling includes a fluid transport member having a fluid conduit with an end. A first component is formed of a polymer overmolded about the end of the fluid transport member. A second component includes a bore having opposing first and second ends, the first end of the bore sealingly receiving the first component. An aerator is coupled to the second end of the second component. A bayonet coupling is configured to axially and rotationally secure the first component to the second component.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to the precise forms disclosed. Rather, the embodiments selected for description have been chosen to enable one skilled in the art to practice the invention.

Figure 1:
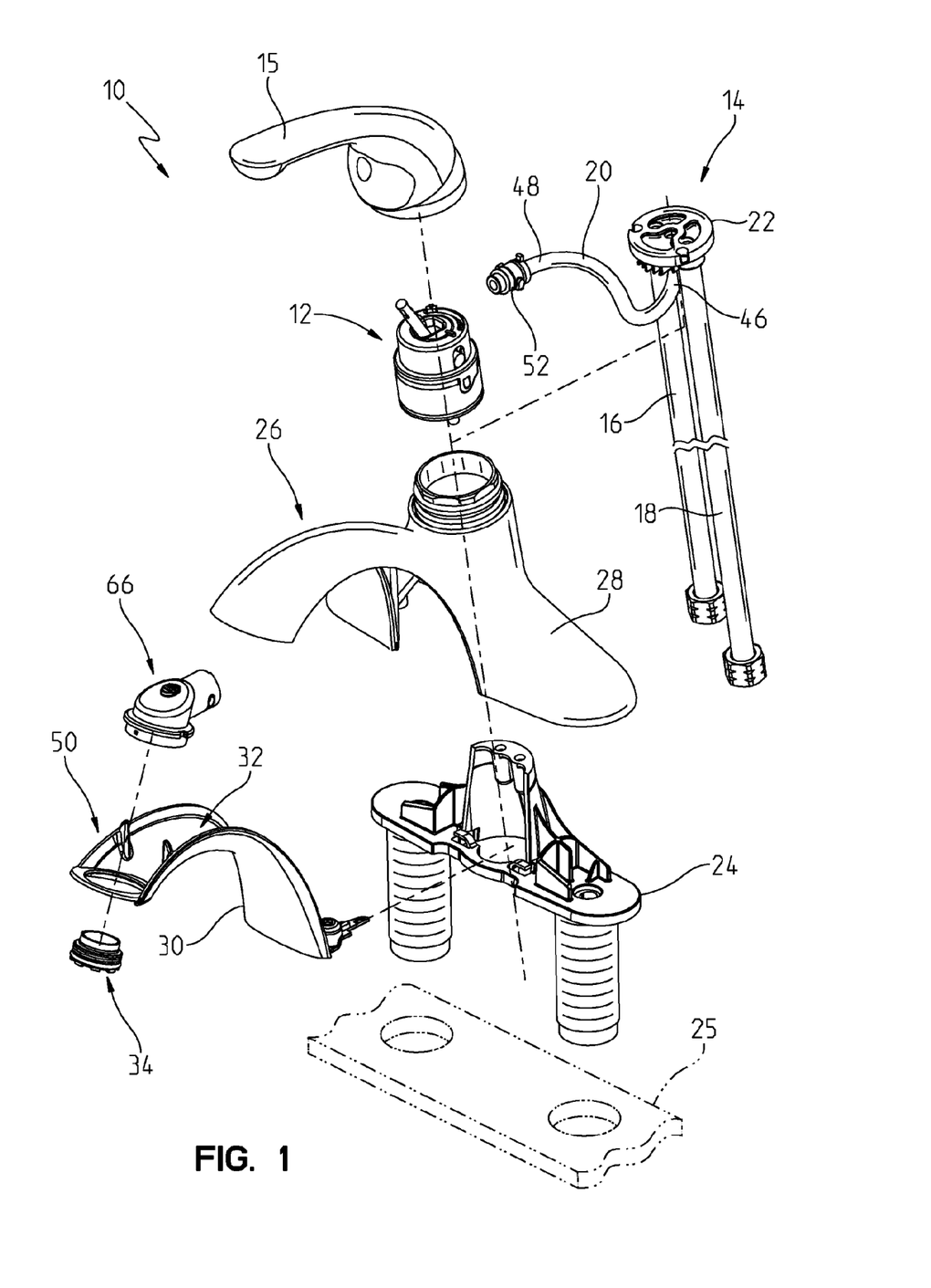
FIG. 1 is an exploded perspective view of an illustrative faucet assembly including a delivery spout and a fluid coupling assembly having a first or male component and a second or female component.

Referring initially to FIG. 1, a water delivery system, illustratively a faucet assembly 10 is shown as including a faucet water control valve 12 configured to control the flow of water through a waterway assembly 14. A user interface, illustratively a handle 15, is operably coupled to the valve 12 to control operation thereof. The waterway assembly 14 illustratively includes a hot water supply fluid transport member or tube 16, a cold water supply fluid transport member or tube 18, and an outlet fluid transport member or tube 20. In the illustrative embodiment, the tubes 16, 18, and 20 are overmolded to a base or valve interface 22 which is fluidly coupled to the valve 12. The valve 12 may be of the type disclosed in U.S. patent application Ser. No. 11/494,889, filed Jul. 28, 2006, entitled "MIXING VALVE," while the waterway assembly 14 may be of the type disclosed in U.S. patent application Ser. No. 11/700,634, filed Jan. 31, 2007, entitled "FAUCET INCLUDING A MOLDED WATERWAY ASSEMBLY."

The base 22 of the waterway assembly 14 is supported by a base or holder 24 which, in turn, is supported by a conventional sink deck 25. More particularly, the supply tubes 16 and 18 extend downwardly from the holder 24 to hot and cold water supplies or stops (not shown), while the outlet tube 18 extends through a delivery spout 26. The delivery spout 26 includes an escutcheon 28 coupled to an undercover member 30 to define a channel or passageway 32 for receiving the outlet tube 20.

Figure 3:
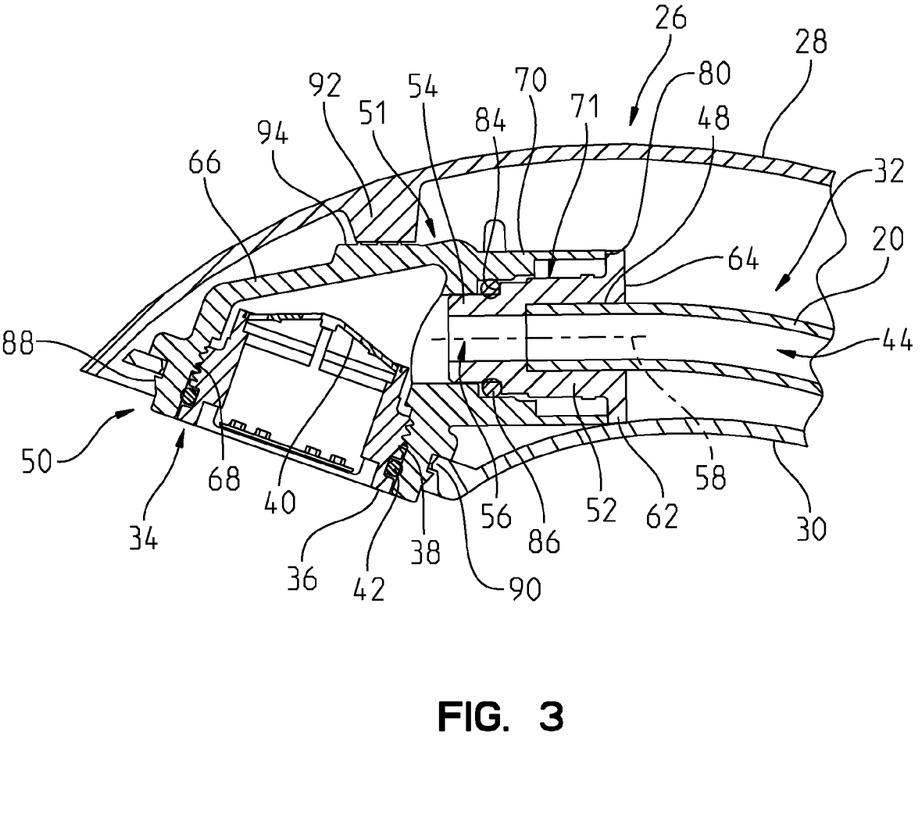
FIG. 3 is a cross-sectional view taken along the longitudinal axis of the delivery spout of FIG. 2.

Referring next to FIG. 3, an aerator 34 is fluidly coupled to the outlet tube 20. Aerator 34 includes an aerator body 36 having external threads 38 and supporting an aerator device, such as a screen 40, and a seal 42. The aerator 34 may comprise any conventional aerator, such as a Cache Faucet Aerator available from Neoperl of Waterbury, Conn.

The fluid transport component or outlet tube 20 defines a fluid conduit or passageway 44 having a first end 46 and a second end 48. The first end 46 of the outlet tube 20 is positioned in fluid communication with the valve 12 through the base 22, as shown in FIG. 1. The second end 48 of the outlet tube 20 is positioned proximate the discharge or outlet end 50 of the spout 26, as shown in FIG. 3. A locking coupling, illustratively a bayonet coupling 51 couples the outlet tube 20 to the aerator 34, as shown in FIG. 3. The coupling 51 includes a first component or male coupling member 52 and a second component or female coupling member 66.

Figure 2:
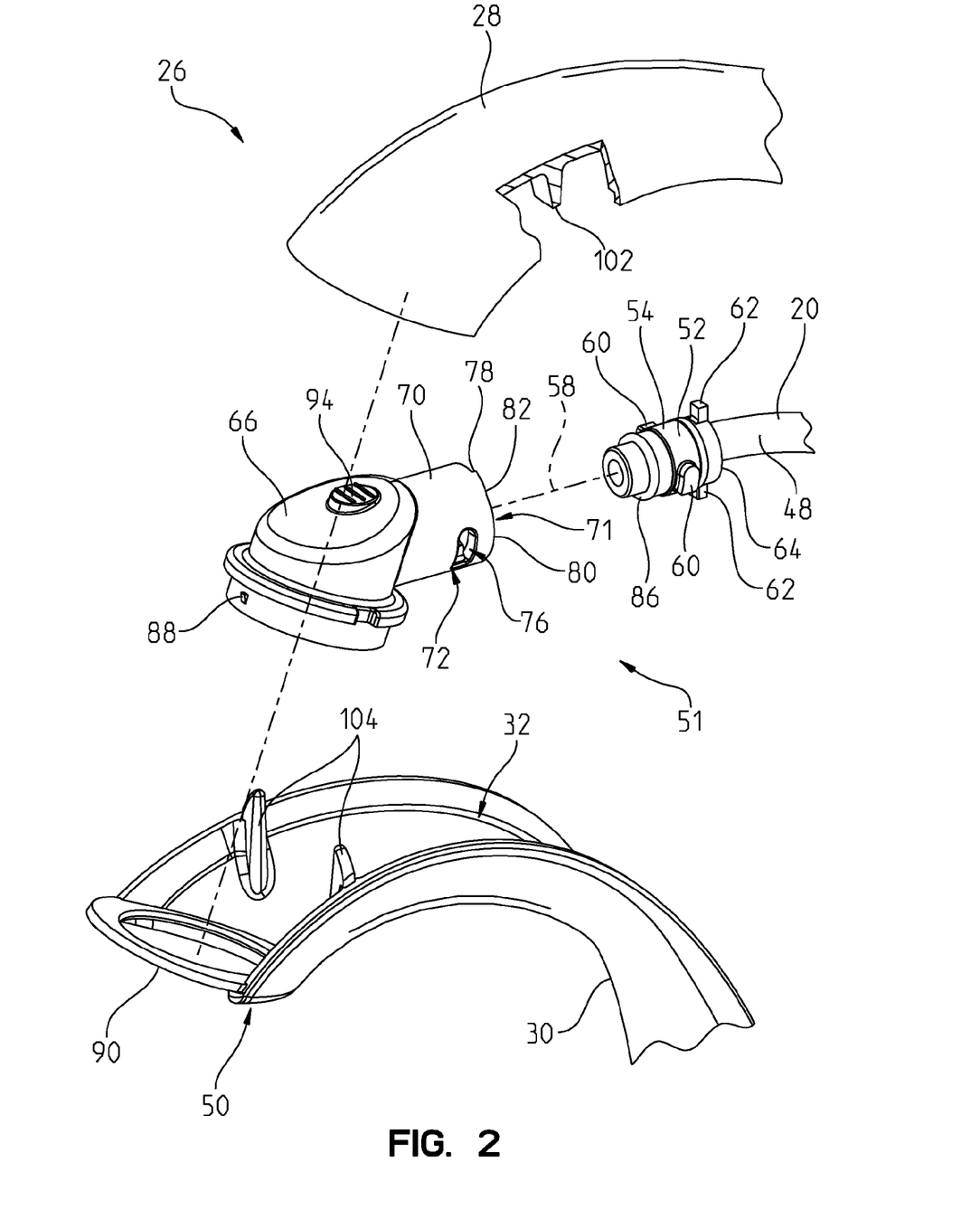
FIG. 2 is an exploded detail view of the delivery spout and the fluid coupling assembly of FIG. 1.

As shown in FIGS. 2, 3, and 6A-6E, the first component 52 is fluidly coupled to the second end 48 of the outlet tube 20. The first component 52 includes a substantially cylindrical side wall 54 defining a fluid conduit 56 extending along a longitudinal axis 58 and in fluid communication with the fluid conduit 44 of the outlet tube 20. A pair of diametrically opposed guide pins 60 extend radially outwardly from the side wall 54, as shown in FIG. 2. A pair of diametrically opposed locking tabs 62 are circumferentially offset, illustratively by approximately 90 degrees (i.e., ¼ turn) from the guide pins 60 and extend radially outwardly from an end 64 of the side wall 54.

Referring back to FIG. 1, the tubes 16, 18, and 20 of waterway assembly 14 are illustratively made of a flexible non-metallic material. In one illustrative embodiment, the tubes 16, 18, and 20 of waterway assembly 14 are made from a polymer, such as a cross-linked polyethylene (PEX). In a further illustrative embodiment, the first component 52 is formed of a polymer which is overmolded about the second end 48 of the outlet tube 20. While any suitable material may be used to form first component 52, a polymer, such as a thermoplastic or a thermoset, is utilized in the illustrative embodiment. After overmolding the first component 52 about the second end 48 of the outlet tube 20, the first component 52 and the outlet tube 20 may be cross-linked together. For example, in the illustrative embodiment, the first component 52 is formed of polyethylene which has been overmolded about the second end 48 of the outlet tube 20 and subsequently cross-linked. It should be noted that reinforcing members, such as glass fibers, may be provided within the polyethylene of the first component 52.

The basic principles of overmolding plumbing connections on tubes are shown in U.S. Pat. Nos. 5,895,695; 6,082,780; 6,287,501; and 6,902,210. U.S. Patent Application Publication Nos. 2007/0271695 and 2007/0044852 also disclose illustrative overmolding methods about water inlet tubes.

In one illustrative embodiment, the polyethylene of tube 20 and first component 52 (which have not been cross-linked or have been only partially cross-linked) are cross-linked following the overmolding process. While it is envisioned that any form of suitable cross-linking may be utilized to form the PEX of tube 20 and first component 52, in one illustrative embodiment the polyethylene is cross-linked by bombarding it with electromagnetic (gamma) or high energy electron (beta) radiation.

While the precise composition of the tube 20 and overmolded first component 52 are not required to be of any specified polymer, in general, there are several guidelines which are applicable in the practice of the illustrative embodiment. It is of course, recognized that the precise operating conditions utilized in the overmolding process are well-known in the art and are specific to each molded polymer. It is well within the skill of the art to determine the applicable conditions which will result in the appropriate overmolded first component 52 and tube 20. The tube 20 and first component 52 may be a thermoplastic or a thermoset. Illustratively, the polymer overmolded first component 52 should be capable of forming a leak-proof bond, either chemical or physical, with the polymer of the tube 20.

The combination of polymers of the tube 20 and the first component 52 illustratively satisfy at least two simultaneous conditions. First, the tube 20 illustratively does not soften and begin melt flow to the point where they lose structural integrity and second, the overmolded first component 52 is illustratively capable of forming an essentially leak-proof interface with the plastic conduit, preferably through either a chemical and/or physical bond between the underlying plastic and the overmolded plastic. According to the illustrative embodiment, the tube 20 is capable of maintaining structural integrity during the overmolding conditions during which the overmolded polymer is in melt flow.

While using polymer compositions which have differing softening points is one way to achieve the above objectives, there are alternatives, one of which would include the use of two compositions which have the same softening point, but which are of different thickness. Through manipulation of the time, temperature and pressure conditions experienced during the molding operation, the tube 20 would not experience melt flow, even though it had a similar softening point or range. It is also possible that through the incorporation of various additives in the polymeric compositions, e.g., glass fibers, heat stabilizers, anti-oxidants, plasticizers, etc., the softening temperatures of the polymers may be controlled.

In an illustrative embodiment of the invention, the composition of the overmolded first component 52 will be such that it will be capable of at least some melt fusion with the composition of the tube 20, thereby maximizing the leak-proof characteristics of the interface between the tube 20 and overmolded first component 52. There are several means by which this may be effected. One of the simplest procedures is to insure that at least a component of the tube 20 and that of the overmold first component 52 is the same. Alternatively, it would be possible to insure that at least a portion of the polymer composition of the tube 20 and that of the overmold first component 52 is sufficiently similar or compatible so as to permit the melt fusion or blending or alloying to occur at least in the interfacial region between the exterior of the tube 30 and the interior region of the overmold first component 52. Another manner in which to state this would be to indicate that at least a portion of the polymer compositions of the tube 20 and the overmold first component 52 are miscible.

As shown in FIGS. 2, 3, 7, and 8A-8I, a second component or female coupling member 66 is fluidly coupled to the aerator 34. More particularly, the second component 66 includes a plurality of internal threads 68 which threadably couple with the external threads 38 of the aerator 34, as shown in FIG. 3. Like the first component 52, the second component 66 may also be molded from a polymer, such as a cross-linked polyethylene (PEX).

The second component 66 includes a substantially cylindrical side wall 70 defining a receiving bore 71 for sealingly receiving the first component 52. The side wall 70 includes a pair of diametrically opposed channels 72 having an axially extending or first portion 74 and a circumferentially extending or second portion 76 extending perpendicular to the first portion 74. The channels 72 are configured to receive the pair of diametrically opposed guide pins 60 of the first component 52. More particularly, and as shown in FIGS. 4A-4D, the axial first portion 74 of each channel 72 is configured to receive the corresponding guide pin 60 as the first component 52 is inserted axially into second component 66, and then the circumferential second portion 76 of each channel 72 is configured to receive the corresponding guide pin 60 as the second component 66 is rotated about the longitudinal axis 58 relative to the first component 52.

Figure 4A:
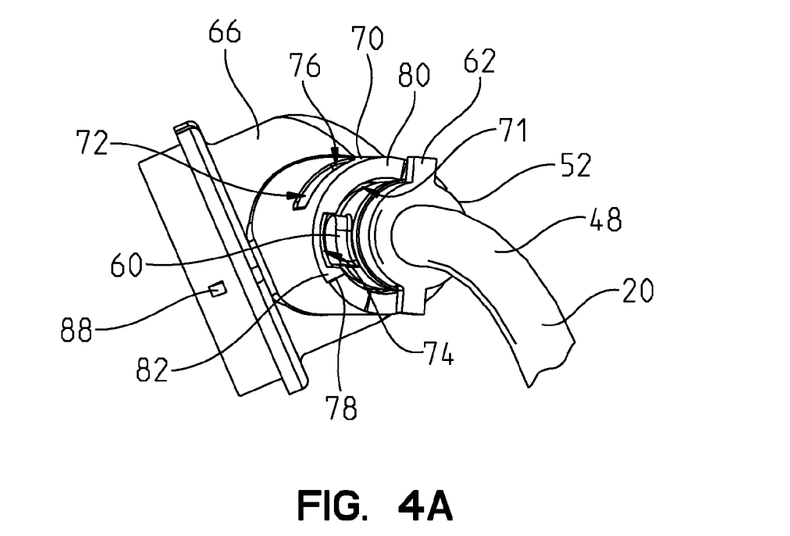
FIG. 4A is a perspective view of the fluid coupling assembly of FIG. 1 shown in an unlocked position.
Figure 4B:
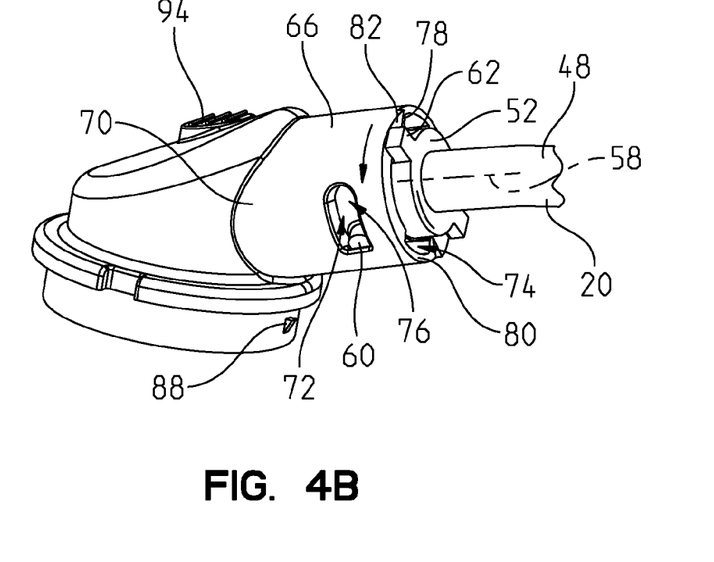
FIG. 4B is a view similar to FIG. 4A showing the fluid coupling assembly in an intermediate position.
Figure 4C:
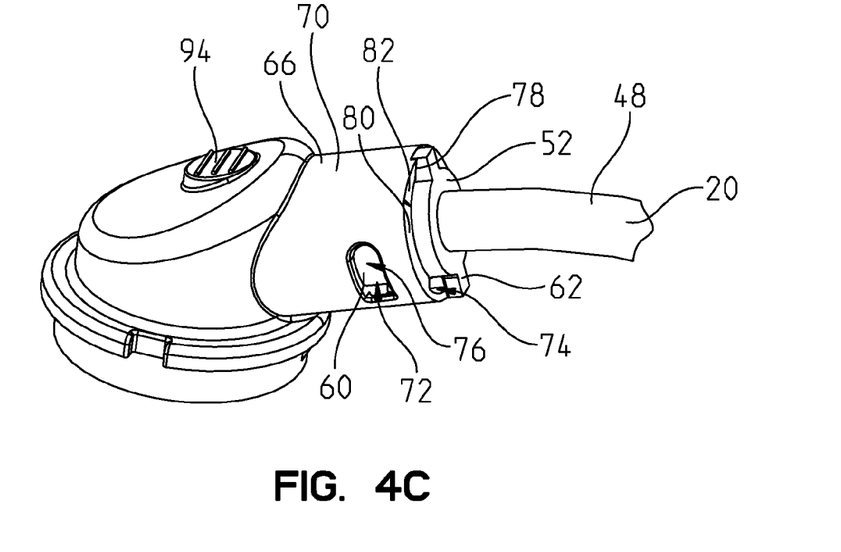
FIG. 4C is a view similar to FIG. 4A showing the fluid coupling assembly in a locked position.
Figure 4D:
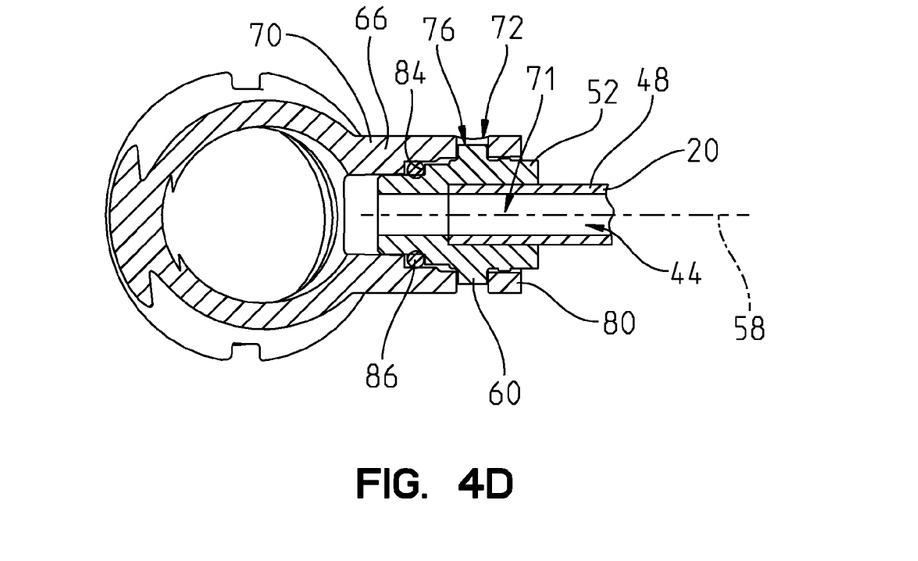
FIG. 4D is a cross-sectional view taken along the longitudinal axis of the fluid coupling assembly of FIG. 4C.
Figure 5:
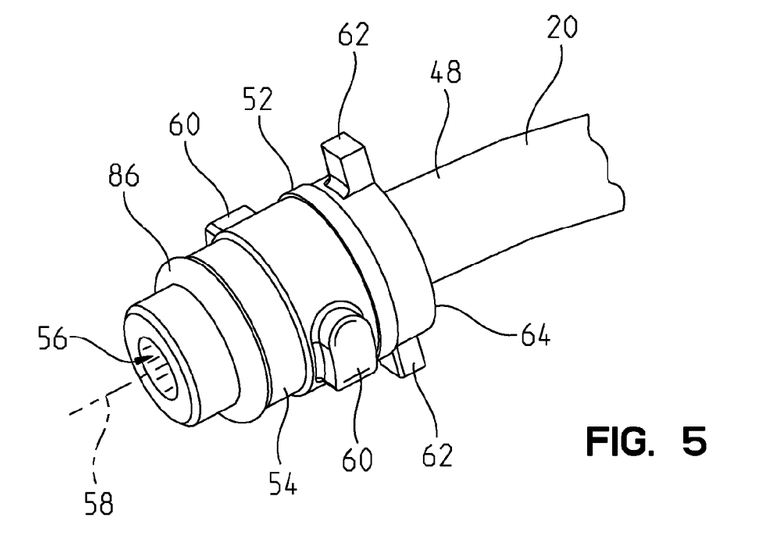
FIG. 5 is a perspective view of the first or male component of the fluid coupling assembly of FIG. 1.
Figure 6A:
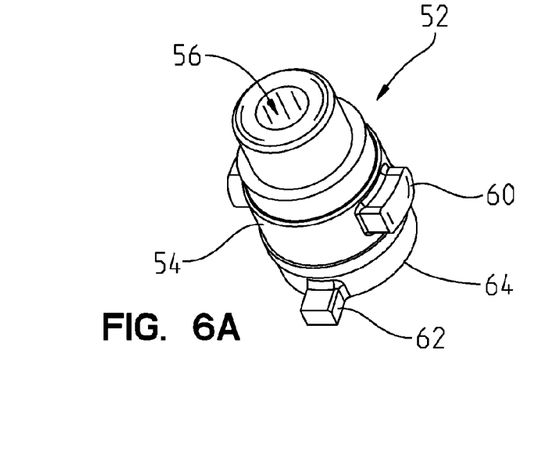
FIG. 6A is a perspective view of the first or male component of the fluid coupling assembly of FIG. 5.
Figure 6B:
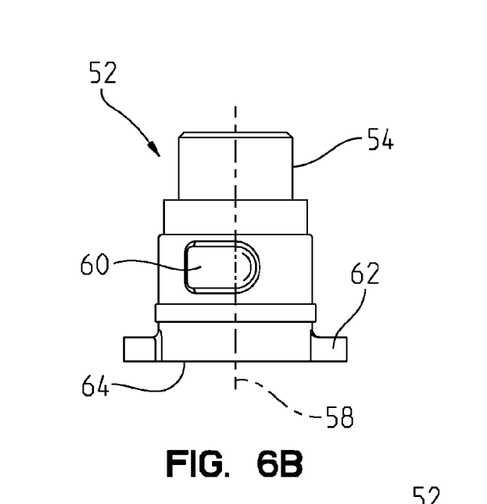
FIG. 6B is a front view of the first or male component of FIG. 6A.
Figures 6C, 6D, 6E:
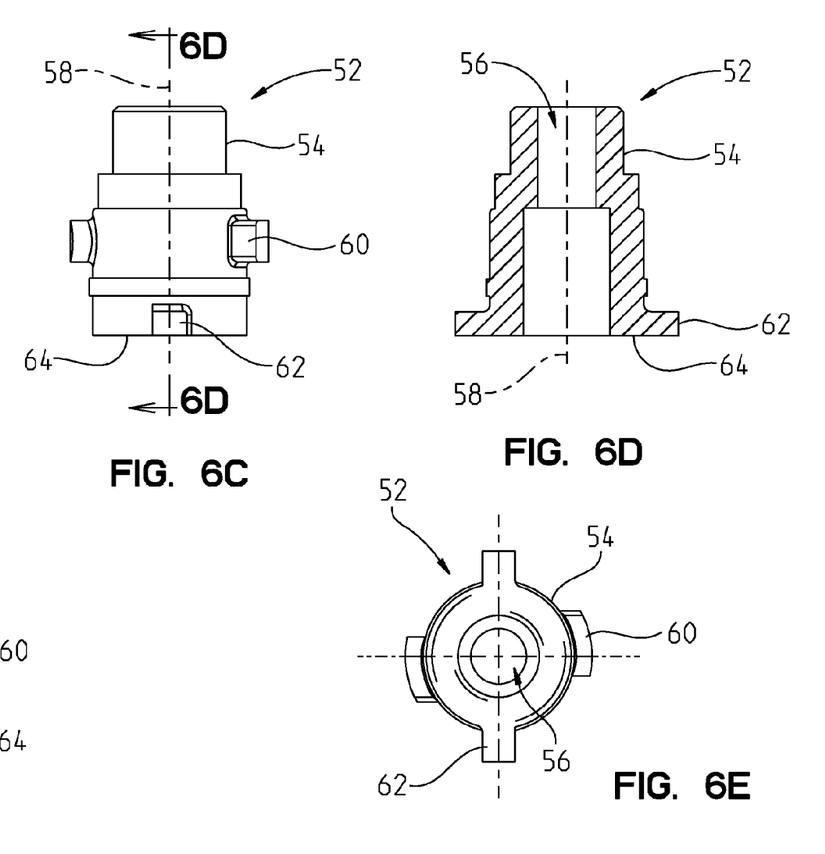
FIG. 6C is a side elevational view of the first or male component of FIG. 6A.
FIG. 6D is a cross-sectional view taken along line 6D-6D of FIG. 6C.
FIG. 6E is a bottom view of the first or male component of FIG. 6A.
Figure 7:
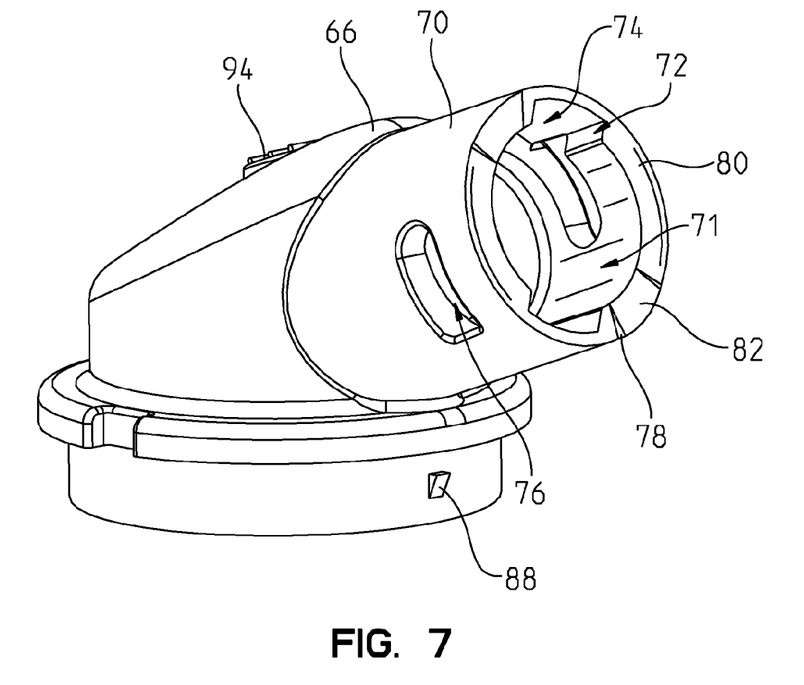
FIG. 7 is a perspective view of the second or female component of the fluid coupling assembly of FIG. 1.
Figure 8A:
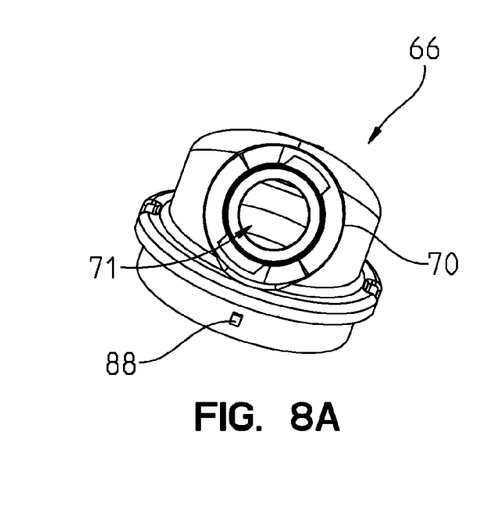
FIG. 8A is a perspective view of the second or female component of the fluid coupling assembly of FIG. 7.
Figure 8B:
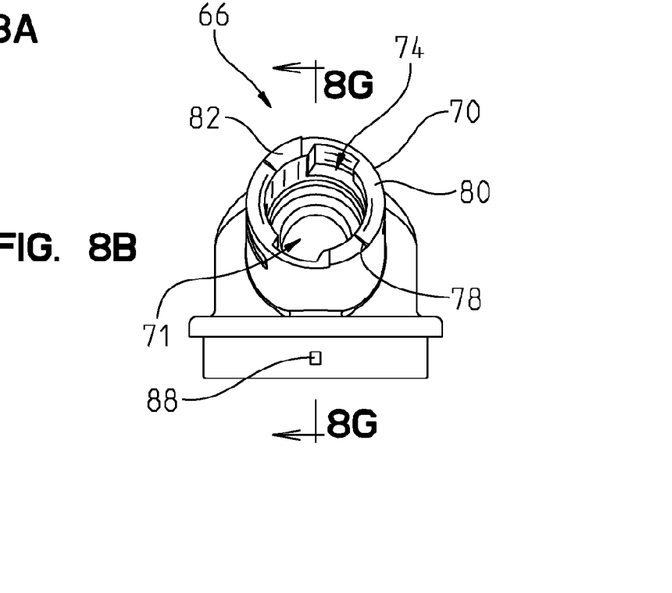
FIG. 8B is rear view of the second or female component of the fluid coupling assembly of FIG. 7.
Figure 8C:
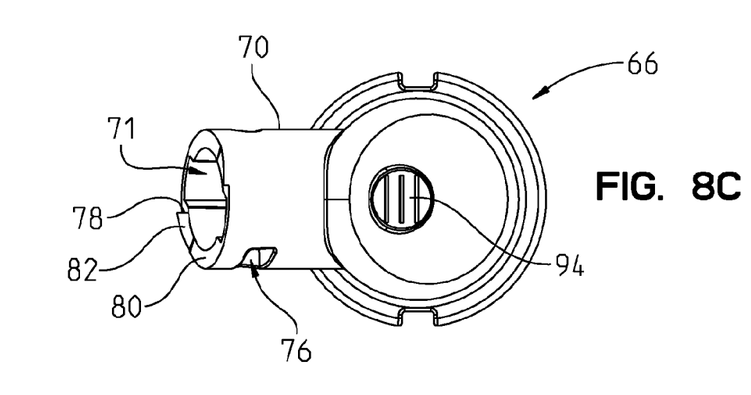
FIG. 8C is a top view of the second or female component of the fluid coupling assembly of FIG. 7.
Figure 8D:
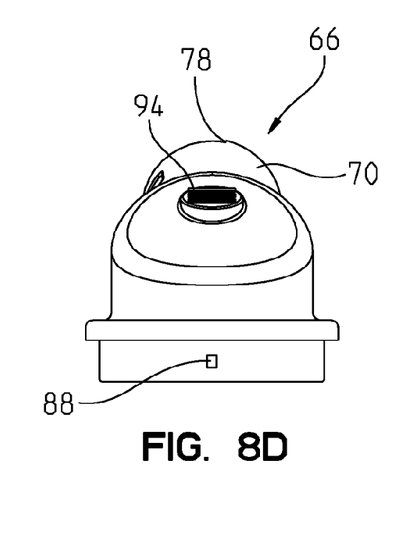
FIG. 8D is a front view of the second or female component of the fluid coupling assembly of FIG. 7.
Figures 8E, 8H:
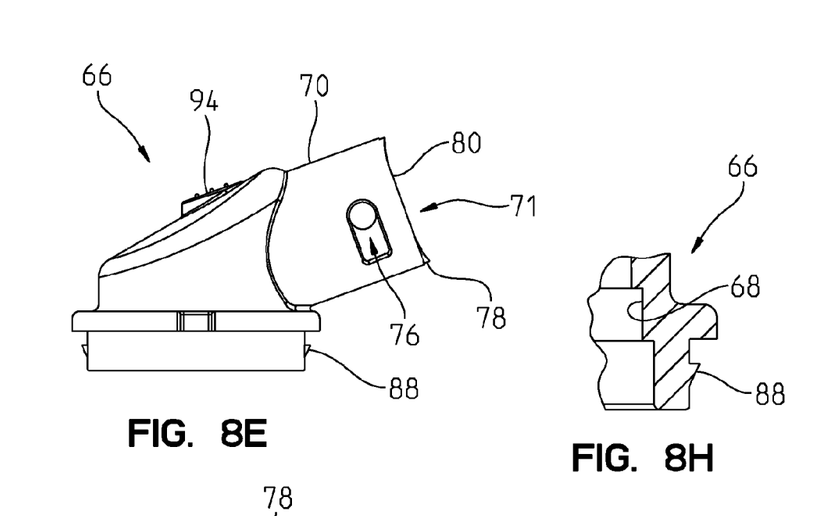
FIG. 8E is a first side elevational view of the second or female component of the fluid coupling assembly of FIG. 7.
FIG. 8H is a first detail view of FIG. 8G.
Figure 8F:
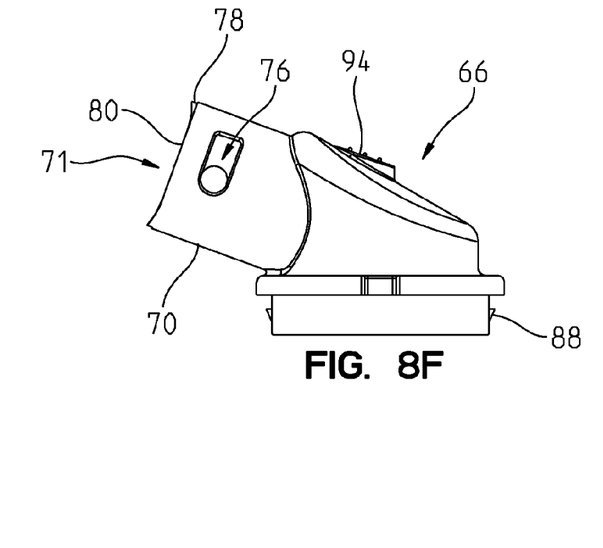
FIG. 8F is a second side elevational view of the second or female component of the fluid coupling assembly of FIG. 7.
Figure 8G:
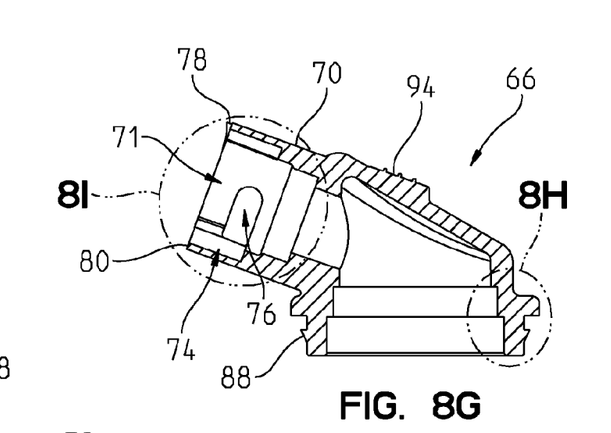
FIG. 8G is a cross-sectional view taken along line 8G-8G of FIG. 8B.
Figure 8I:
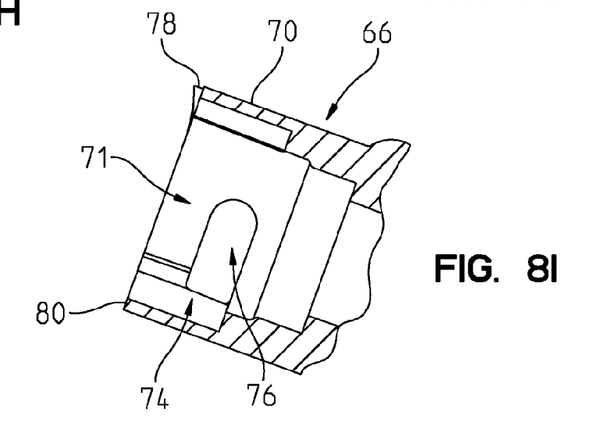
FIG. 8I is a second detail view of FIG. 8G.

Referring to FIGS. 2 and 7, at least one lip 78 is defined in the end 80 of the side wall 70 of the second component 66. In the illustrated embodiment, second component 66 includes two lips 78, and each lip 78 includes a corresponding, adjacent ramp 82. In use, locking tabs 62 of the first component 52 cooperate with lips 78 of second component 66 to lock the first component 52 relative to the second component 66. In the unlocked position, as shown in FIG. 4A, the locking tabs 62 of the first component 52 are spaced apart from the end 80 of the side wall 70 of the second component 66, allowing the guide pins 60 of the first component 52 to translate axially into the axial first portions 74 of the channels 72. As the second component 66 is rotated freely relative to the first component 52 about the longitudinal axis 58, as shown in FIG. 4B, the locking tabs 62 of the first component 52 begin to flex over the ramps 82 as the locking tabs 62 approach the lips 78. In the locked position, as shown in FIG. 4C, the locking tabs 62 snap and lock behind the lips 78 to prevent the second component 66 from rotating back relative to the first component 52. In this locked position, the guide pins 60 of the first component 52 are received within the circumferential second portions 76 of the channels 72, such that the first component 52 is restrained from axial movement relative to the second component 66. This locking connection is audible, tactile and visual so that a user can be sure that the connection has been properly made. The connection provided between the first component 52 and the second component 66 is configured to withstand pressurized fluid of up to 500 psi and to facilitate quick and simple assembly through a bayonet type coupling defined by the pins 60 of the first component 52 and the channels 72 of the second component 66.

The first component 52 may be removed from the second component 66 by reversing the steps described above. For example, the locking tabs 62 may be flexed by hand or by using a suitable tool (not shown), for example, to free the locking tabs 62 from the lips 78. Then, the second component 66 may be rotated relative to the first component 52 so that the locking tabs 62 run down the adjacent ramps 82. After the guide pins 60 exit the circumferential second portions 76 and enter the axial first portions 74 of the channels 72, the first component 52 may be pulled axially away from the second component 66.

As shown in FIG. 3, an o-ring groove or seat 84 receives an o-ring 86 to provide a fluid seal between the first and second components 52 and 66. The seat 84 is split between the first and second components 52 and 66 so that a parting line can be avoided on the o-ring surface. However, the o-ring seat 84 may be located solely on the first component 52 if the parting line is controlled and aligned.

Figure 9:
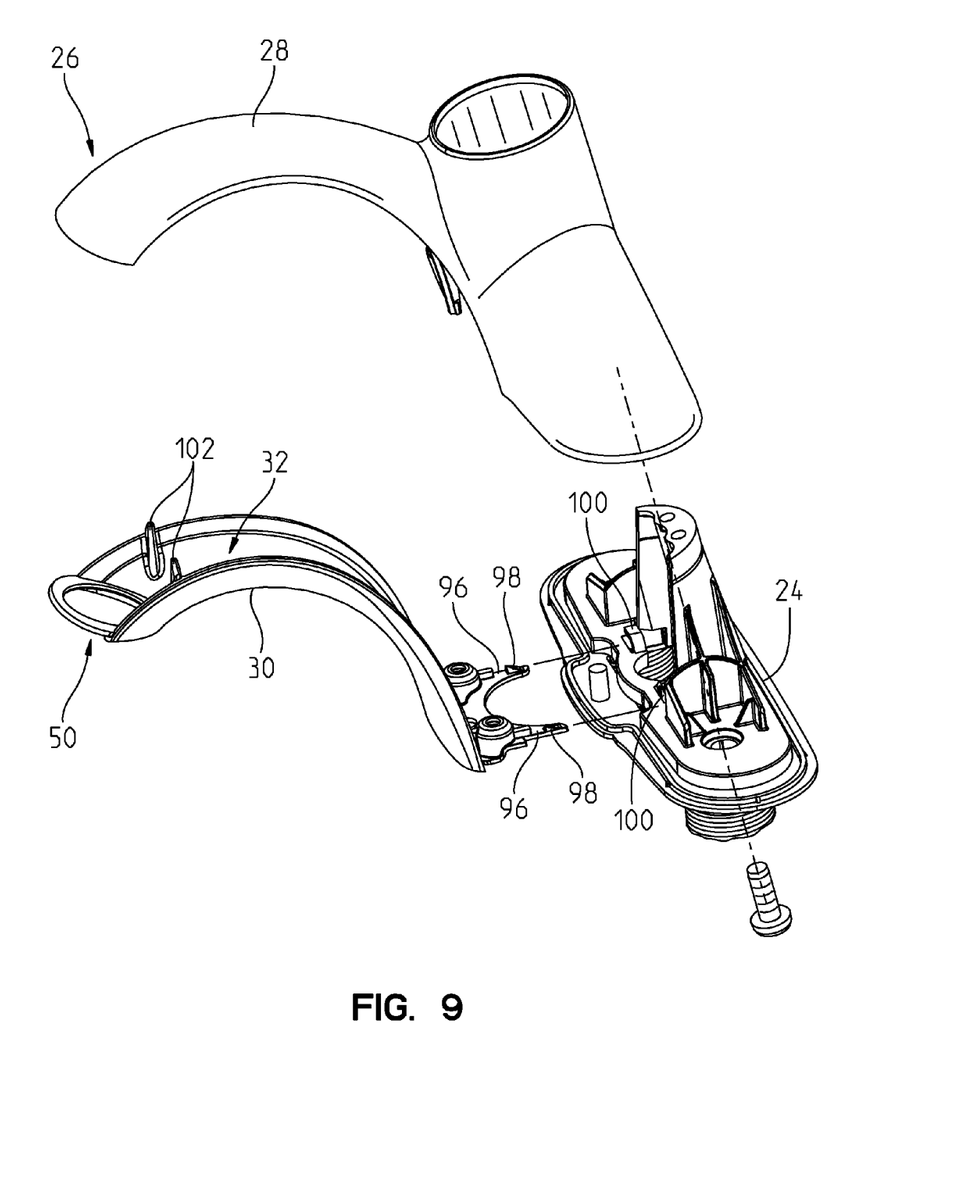
FIG. 9 is an exploded perspective view of the delivery spout of FIG. 1.

With reference to FIGS. 2, 3, and 9, retaining tabs 88 are provided proximate the outlet end of the second component 66 and are configured to engage or snap over a ring 90 supported at the outlet end 50 of the undercover member 30 of the spout 26. The escutcheon 28 includes a downwardly extending projection 92 that is configured to engage an upper pad 94 formed on the second component 66, as shown in FIG. 3, thereby retaining the coupling 51 within the spout 26. The undercover member 30 includes fingers 96 having retaining tabs 98 that secure to arms 100 of the base 24, as shown in FIG. 9. Engagement between tabs 102 and 104 of the escutcheon 28 and the undercover member 30, respectively, secure these components together to form spout 26, as shown in FIG. 2.

Although the invention has been described in detail with reference to certain preferred embodiments, variations and modifications exist within the spirit and scope of the invention as described and defined in the following claims.

The invention claimed is:
1. A water delivery system in fluid communication with at least one valve, the water delivery system comprising:
    a spout including a discharge end;
    an aerator for positioning adjacent the discharge end of the spout;
    a fluid transport member having a first fluid conduit with a first end in fluid communication with the at least one valve and a second end positioned proximate the discharge end of the spout and upstream from the aerator;
a first component directly coupled to the fluid transport member, the first component including a side wall defining a longitudinal axis and a second fluid conduit extending along the longitudinal axis and in fluid communication with the first fluid conduit of the fluid transport member, the first component further including at least one guide pin extending radially outwardly from the side wall;
a second component coupled to the aerator, the second component including a side wall defining a bore sealingly receiving the first component and having a channel to receive the at least one guide pin wherein the second component is rotatable relative to the first component between an unlocked position and a locked position, the at least one guide pin being free to move axially within the channel when in the unlocked position and being restrained from axial movement within the channel when in the locked position;
wherein the channel of the second component includes an axially extending portion and a circumferentially extending portion extending perpendicular to the axially extending portion; and
wherein the first component further comprises a locking tab wherein the side wall of the second component includes a lip configured to engage the at least one locking tab and prevent rotational movement of the second component relative to the first component in a first direction.

2. The water delivery system of claim 1, wherein the first component is an overmold component coupled to the fluid transport member.

3. The water delivery system of claim 1, wherein the second component includes a first set of threads and the aerator includes a second set of threads, the first set of threads and the second set of threads cooperating to couple the aerator to the second component.

4. The water delivery system of claim 1, wherein a seal is positioned between the first component and the second component.

5. The water delivery system of claim 1, wherein the spout member includes a channel for receiving the fluid transport member, the channel including a portion receiving the second component.

6. The water delivery system of claim 5, wherein the second component is held in position relative to the spout by a downwardly facing surface of the spout engaging an upper surface of the second component.

7. The water delivery system of claim 1, wherein the fluid transport member is made of a non-metallic material.

8. The water delivery system of claim 7, wherein the fluid transport member is made of a PEX material.

9. A water delivery system in fluid communication with at least one valve, the water delivery system comprising:
a body including a side wall defining a longitudinal axis;
a fluid transport member having an end positioned within the body and adapted to be in fluid communication with the at least one valve;
a coupling member supported by the body and including a fluid conduit having a first end and a second end, the end of the fluid transport member being received in the first end of the coupling member;
an aerator coupled to the second end of the coupling member, the aerator positioned downstream from the body;
wherein the body includes a pair of diametrically opposed guide pins, and the coupling member includes a pair of diametrically opposed channels configured to receive the guide pins;
wherein the end of the fluid transport member is held within the fluid conduit of the coupling member by translating the coupling member along the longitudinal axis of the body in a first direction and then rotating the coupling member about the longitudinal axis in a second direction to a locked position at which the pair of guide pins are restrained from axial movement relative to the channels, and the end of the fluid transport member is removable from within the fluid conduit of the coupling member by rotating the coupling member about the longitudinal axis in a third direction opposite the second direction and translating the coupling member along the longitudinal axis of the body in a fourth direction opposite the first direction to an unlocked position at which the pair of guide pins can axially move relative to the channels; and
wherein the body includes a pair of diametrically opposed locking tabs, and the first end of the holder including a pair of lips configured to engage the locking tabs and prevent rotational movement of the holder relative to the body in the third direction.

10. The water delivery system of claim 9, wherein the body comprises an overmold component coupled to the first end of the fluid transport member.

11. The water delivery system of claim 10, wherein the body is made of a non-metallic material.

12. The water delivery system of claim 11, wherein the body is made of a PEX material.

13. The water delivery system of claim 9, wherein the fluid transport member is made of a non-metallic material.

14. The water delivery system of claim 13, wherein the fluid transport member is made of a PEX material.

15. A fluid coupling comprising:
a fluid transport member having a fluid conduit with an end;
a first component formed of a polymer overmolded about the end of the fluid transport member;
a second component including a bore having opposing first and second ends, the first end of the bore sealingly receiving the first component;
an aerator coupled to the second end of the second component;
a bayonet coupling configured to axially and rotationally secure the first component to the second component and upstream from the aerator;
wherein the first component includes a side wall and at least one guide pin extending radially outwardly from the side wall, the second component includes a side wall having at least one channel to receive the at least one guide pin, the second component being rotatable relative to the first component between an unlocked position and a locked position, the at least one guide pin being free to move axially relative to the channel when in the unlocked position and being restrained from axial movement relative to the channel when in the extending portion; and
wherein the first component further comprises a locking tab wherein the side wall of the second component includes a lip configured to engage the at least one locking tab and prevent rotational movement of the second component relative to the first component in a first direction.

* * * * *